United States Patent Office 2,903,445
Patented Sept. 8, 1959

2,903,445

MONOACYL DERIVATIVES OF DISUBSTITUTED CARBAMIDES AND PROCESS OF PREPARATION

Lloyd I. Osipow, Monsey, and William C. York, Westbury, N.Y., assignors to W. R. Grace & Co., a corporation of Connecticut No Drawing. Application June 5, 1957
Serial No. 663,580

20 Claims. (Cl. 260—211.5)

This invention relates to monoacyl derivatives of substituted carbamides and a process for preparing the same. In one specific aspect, it relates to a novel method for preparing fatty acid monoesters of diglucose ureide. In another aspect it relates to the new chemical compounds obtained by this method.

Diglucose ureide is well known, having been reported by B. Helferich and W. Kosche in Chemische Berichte, 59, 69–79 (1926), and by T. Johnson and W. Bergman in J. Am. Chem. Soc., 54, 3362 (1932). Diglucose ureide has been suggested for use in feeding cattle, since it is somewhat less toxic than urea. None of the esters of diglucose ureide have ever been reported.

Certain long chain substituted ureas have been reported to be useful in formulating detergent compositions. Ross, in U.S. Patent No. 2,708,183, points out that long chain higher alkyl urea derivatives enhance the detergency of anionic sulfated and sulfonated materials in the presence of builders. Unfortunately, the wide spread use of the urea derivatives described by Ross is limited, since such derivatives by themselves have poor foaming, deterging, and solubility properties, and are valueless as cleaning agents per se. In fact, none of the hitherto known fatty acid urea derivatives in itself has ever been reported to be a good detergent. We have discovered certain novel monoesters of diglucose ureide which are not subject to these limitations. Our new compositions are surface active, and have excellent detergent properties.

It is, therefore, an object of the present invention to provide a new generic class of chemical compounds which are useful as both high and low foaming detergents and emulsifiers. It is a further object to provide a novel method for preparing these compounds.

According to the present invention, we have discovered a new class of chemical compounds characterized by the structural formula:

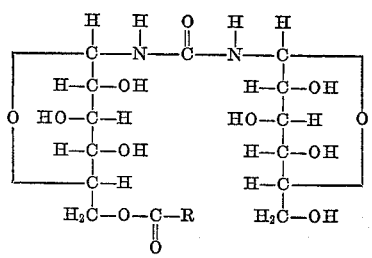

In the above formula, R is a hydrocarbon residue of the formula $C_nH_m$ where $n$ is an integer of at least 7 and not more than 23 and $m$ is an integer in the range between $2n-3$ and $2n+1$ inclusive. Thus, R is an alkyl, alkenyl or alkadienyl radical having from 7 to 23 carbon atoms. It is obvious that the product of the above formula is the same whether the acyl moiety is substituted on the 6 or 6' position. Generically, our new compounds are described as the monofatty acid esters of diglucose ureide. Typical novel diglucose ureide esters embraced by the present invention include the caprylate, pelargonate, caprate, undecanoate, laurate, tridecanoate, myristate, pentadecanoate, palmitate, margarate, stearate, nonadeconoate, arachidate, heneicosanoate, behenate, tricosanoate, lignocerate, oleate, palmitoleate, petroselinate, erucate, linoleate, eleosterate, and the like. Suitable esters also include mixtures of those enumerated hereabove. For example, the diglucose ureide esters of coconut oil, palm oil, tall oil, olive oil, soybean oil and tung oil are also operative for purposes of the present invention.

Our novel compounds are prepared by a new alcoholysis reaction between diglucose ureide and an ester of a fatty acid of the general formula:

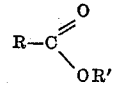

R has the meaning hereinbefore described. R' is an organic moiety. In a preferred embodiment of our invention R' is a lower alkyl radical; i.e., up to and including hexyl. The lower alkyl esters of the fatty moieties of the above formula are suitable for the alcoholysis reaction, since they result in the formation of an alcohol sufficiently volatile to permit its removal from the reaction mixture by simple distillation as the reaction progresses. Since alcoholysis is an equilibrium reaction, it follows that some diglucose ureide monoester is formed whether or not the by-product alcohol is separated. Thus, any organic ester of a fatty acid is suitable in the present process including those such as glycerides which are less volatile than the solvent selected for the reaction medium. However, if the alcohol is not volatile, the reaction will proceed only until equilibrium conditions are established. The novel reaction is shown below in Equation 1.

(1) 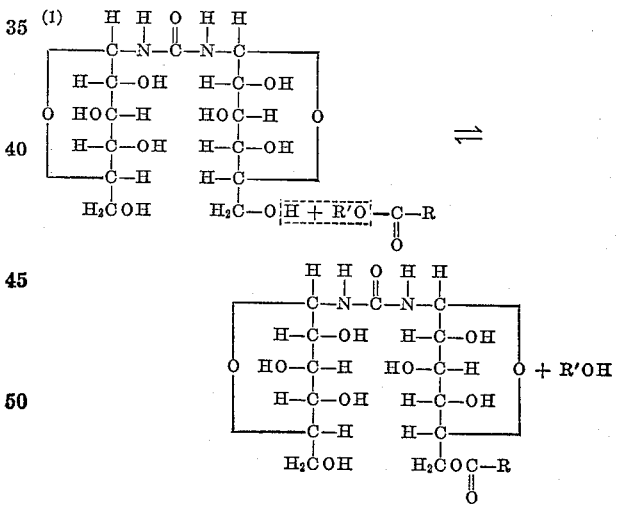

From the above equation, it is evident that the equilibrium will shift to the right if the alcohol is removed as it is formed. Consequently, the reaction is faster if esters of the more volatile alcohols are used. Under the preferred conditions of temperature and pressure, the alcohol can be conveniently stripped free of the reaction mixture by using reduced pressure to aid distillation of the alcohol therefrom or by blowing an inert gas through or over the surface of the reaction mixture. Furthermore, a large surface area will favor stripping of the product alcohol. A number of different types of film evaporators are commercially available, and these can be used with vacuum or an inert gas.

Suitable solvents for our novel alcoholysis reaction are those which will dissolve both diglucose ureide and the starting ester without preferential reaction with either of the products or the reactants. In the preferred embodiment of our invention we use dimethylsulfoxide or monomethylformamide.

Our novel reaction is effectively catalyzed by an alkaline catalyst. By the term "alkaline catalyst" we mean a basic organic salt or a salt of a metal selected from groups I, II or IV of the periodic table and a weak acid. Proton-accepting metals such as tin and zinc are also embraced by the term "alkaline catalyst." Likewise, quaternary ammonium bases and similar compounds are effective for this purpose. Exemplary catalysts include sodium hydroxide, potassium hydroxide, sodium carbonate, sodium methoxide, potassium ethoxide, trisodium phosphate, lithium hydroxide, magnesium hydroxide and lead oxide. Alkali metal hydroxides, alcoholates, carbonates and phosphates are the preferred catalysts. The corresponding alkaline earth compounds are also suitable.

The general procedure for preparing the monofatty esters of diglucose ureide is as follows: A quantity of diglucose ureide is admixed with a lower alkyl ester of a fatty acid in mutual solvent. We have already indicated that sulfoxides, e.g., dimethylsulfoxide, are preferred solvents. The resulting solution may be placed in a container equipped with a vacuum sealed stirrer and a fractionating column. The solution is then heated, preferably to a temperature of about 60–95° C. under a reduced pressure of about 5 to 50 mm. Hg absolute for one hour to remove the major portion of any moisture that may be present. A quantity of catalyst (preferably moisture free) is added to this solution and the temperature thereof is maintained at about 60–95° C. under an absolute pressure of about 5–50 mm. Hg. During the reaction some of the solvent is distilled off along with most of the by-product alcohol formed by the alcoholysis reaction. If desired, the reaction may be stopped at a convenient time to replace the amount of solvent which has been distilled off. With an efficient fractionating column, the solvent will be returned automatically to the reaction mixture, thus obviating such a step.

While the time of the reaction is not particularly critical, we find it preferable to let it continue from 1 to 12 hours. Actually, some product is formed in a few minutes at the preferred temperature range. The required reaction time will depend upon the reaction temperature and the efficiency with which the product alcohol is stripped from the system. When the reaction is carried out under preferred conditions, e.g., with methyl esters at 95° C. and potassium carbonate catalysts, from 1 to 5 hours is generally adequate for complete conversion into the novel diglucose ureide ester.

After the reaction is stopped the catalyst can be neutralized with any acid. Acetic acid is effective for this purpose. While the neutralization step is not a necessary feature in obtaining our novel products, the purity of such products can be enhanced by converting the soap, which is invariably formed in the reaction, to fatty acids by neutralization. The fatty acids are subsequently extracted from the reaction mixture using standard laboratory techniques. Purification methods will be discussed in greater detail infra.

The entire reaction is preferably carried out under anhydrous conditions, since we have found that the presence of several percent of water may result in reduced yields. A slight amount of moisture is not excessively deleterious, since moisture initially present in such quantities is rapidly removed by distillation. In effect, the reaction is carried out under substantially anhydrous conditions.

The quantity of catalyst required to effectively promote our novel reaction is in the range of 0.05–0.03 moles per mole of starting ester. In the preferred embodiment about 0.15 mole of catalyst are used. High levels of catalyst produce excessive amounts of soap which in turn decreases the purity of the ultimate product. Using low levels, the alcoholysis reaction is slower considerably.

The effective mole ratio of diglucose ureide to fatty acid ester for obtaining our novel compounds in good yield is generally about 3 to 1; however, such a mole ratio is no absolutely critical and some degree of variation may be tolerated. If the mole ratio of diglucose ureide to fatty acid ester is less than about 3 to 1, more highly substituted esters of diglucose ureide are also formed. However, lower ratios of diglucose ureide to fatty acid ester may be employed and the resulting mixture of mono or higher acyl derivatives can be subsequently separated.

Our novel alcoholysis reaction can be carried out over a wide temperature range. We have previously indicated that the reaction rate is more rapid at elevated temperatures. However, degradation of the diglucose ureide and discoloration of the ultimate product is more pronounced as the temperature of the system is increased. Consequently, we prefer to carry out the reaction in the range of about 60–95° C. The volatility of the alcohol formed during the reaction is an important criterion for choosing an operating temperature within the preferred range.

We have mentioned that stripping alcohol from the system is facilitated by using a reduced pressure. We have found, as a matter of practice, that a reduced pressure of about 5 to 10 mm. Hg absolute represents a preferred range. However, a greater range of pressures of less than atmospheric is operable.

The novel products are obtained from the solvent as crude crystalline masses. They may be used as such or they may be further purified by various procedures readily apparent to those skilled in the art. On a commercial scale, several methods of purification are feasible. If the reaction is carried out using a substantial excess of diglucose ureide (to avoid formation of multi-substituted esters), the preferred purification technique is as follows: At the completion of the reaction, the mixture is neutralized to convert soap to fatty acids. The solution is then extracted with an aliphatic hydrocarbon solvent, such as hexane or heptane, to remove free fatty acids and unreacted ester. A water-immiscible solvent such as n-butanol is then added to the solution, which is then solvent-extracted with an aqueous sodium chloride solution to remove the reaction solvent, unreacted diglucose ureide, and other water-soluble impurities. The butanol solution is then carbon treated to remove color, and distilled. A steam distillation will remove the last traces of butanol. If more highly substituted esters of glucose ureide are present in the reaction mixture, the hexane treatment is preferably omitted. The reaction mixture is neutralized, partitioned between n-butanol and salt solution, washed further with salt solution, and the solvents removed by distillation. The monoester can then be recovered by precipitation from anyone of a number of polar solvents, such as acetone or methanol.

A pure sample may be obtained conveniently by absorption chromatography. A chromatographic column may be prepared by packing a quantity of a mixture containing 3 parts by weight Florex XXX (hydrated sodium aluminum silicate of the fuller's earth type) and 1 part by weight of Celite 545 (diatomaceous earth) into a glass tube to give a long adsorbent column that is small in diameter. A portion of the sample to be chromatographed is dissolved in a solvent mixture composed of equal parts of methanol and benzene. The column is pre-wetted with this same solvent mixture and then the solution containing the sample is added to the top of the column. After this solution has flowed below the top level of the column, fresh solvent is added and the column is eluted with a quantity of the solvent mixture (benzene-methanol, 1:1). Fractions are collected at the bottom of the column and evaporated to dryness. Usually, about 5 of the fractions collected contain the major portion of the sample. The central fraction is generally considered to be the purest of the 5 fractions; this fraction may be characterized by determining its melting point, specific rotation, and chemical composition.

In view of the established properties of reported urea derivatives, it is completely unobvious that the physical and chemical characteristics of our novel compounds would make them useful both as built and unbuilt detergents. A brief discussion of detergency, specifically related to the properties of the diglucose ureide monoesters, is appropriate at this point. The structural nature of the diglucose ureide mono-fatty ester molecule is largely responsible for its effectiveness as a nonionic detergent. The acyl moiety depending, of course, upon its length is more or less hydrophobic or water repelling. The hydroxyl groups, on the other hand, are hydrophilic or water attracting. When one of our novel chemical compounds is dissolved in water the hydrophobic portion of the molecule becomes positively absorbed, or oriented outward from the surface of the water. The hydroxyl groups, however, tend to become drawn into the water. The concentration of the hydrophobic portions of the molecule in the water surface leaves fewer water molecules in the surface to be attracted by the water molecules of the interior. This concentration of hydrophobic groups in the surface particularly favors the lowering of the surface tension of the solution. Thus, the tendency of our novel unsymmetrical molecules to become oriented in solution with their acyl moiety outward from the liquid surface has an important effect upon surface activity and detergency. This effect establishes the lower limit of the required number of carbon atoms contained by the acyl moiety to produce an effective surfactant. For example, for our purposes if we selected as a urea derivative one containing a highly water-soluble organic acid group such as an acetate group, the hydrocarbon end of the molecule would not be sufficiently water repellent to prevent the polar group from pulling the hydrocarbon end entirely into the water phase. Without the necessary concentrating of molecules in the surface of the solution, there is no pronounced effect on surface tension, and hence no surface activity. We have found that an acyl moiety of at least 8 carbon atoms is of sufficient length to have the desired effect on surface tension. Our upper limitation of 24 carbon atoms in the acyl moiety is predicated largely upon solubility. As the length of a hydrocarbon chain increases there is a measureable decrease in solubility. The presence of unsaturation in such a chain has a mitigating effect upon such a decrease. However, diglucose ureide monoesters having acyl moieties of more than 24 carbon atoms would not be sufficiently soluble to be effective as detergents, or as additives in detergent compositions.

The presence of a detergent in a solution effectively reduces the interfacial tension at liquid-liquid or liquid-solid interfaces as well as the surface tension. Generally speaking, detergents of increased molecular weight effect a reduction in the concentration necessary to obtain the minimum interfacial tension and a reduction in value of the interfacial tension at its minimum.

Not all surfactants are good detergents. In order for a surfactant to be an excellent detergent it must have (1) ability to wet and spread on liquid and solid surfaces, (2) ability to form a stable foam, (3) ability to emulsify oily materials, (4) ability to peptize aggregates of solid particles and (5) ability to deflocculate or stabilize dispersed systems of solid particles. Our novel compounds possess, to a measurable extent, these desirable properties. The effectiveness of our compounds in this respect is further discussed in connection with the standard commercial detergent evaluation tests which appear in the examples that follow.

EXAMPLE I

*Diglucose ureide laurate*

A reaction apparatus was assembled by equipping a 3-necked flask with a stirrer and a 10-bulb fractionating column leading to a receiver. This flask was charged with 1.5 liters of dimethyl sulfoxide, 384 g. (1 mole) of diglucose ureide and 71 g. (0.33 mole) of methyl laurate. The solution was heated to 90° C. under a pressure of 15 mm. Hg. absolute for one hour to remove any moisture that may have been present. A 7 g. portion of potassium carbonate was added. The solution was then heated with stirring at 90° C. for 12 hours under a pressure of 15 mm. Hg absolute for one hour to remove any moisture—approximately 700 ml. of distillate had been collected. A 700 ml. portion of fresh dimethyl sulfoxide was added to the reaction mixture and distillation was continued for an additional 6 hours.

The solution was cooled, neutralized with acetic acid and filtered to remove a small quantity of diglucose ureide which precipitated during the cooling process. The clear filtrate, approximately 900 ml., was diluted with 1 liter of butanol and 1 liter of concentrated saline solution. The butanol layer was decolorized with activated carbon and distilled to a thick residue. This residue was dissolved in 400 ml. of hot ethanol. The solution was then cooled and diluted with 1 liter of acetone. The resulting solution was chilled to minus 10° C. to precipitate 68 g. of product. The crude product contained 3.59% nitrogen (theory 4.96%) and 29.5% lauric acid equivalent (35.4%). One recrystallization of this material from ethanol gave a product containing 4.6% nitrogen.

The novel product was purified by adsorption chromatography, according to the procedure set forth in the specification, supra. It melted at 204–212° C. and had a specific rotation of $$[\alpha]\frac{22°\ C.}{D} = +17.83°$$

in dimethyl sulfoxide. A sample was analyzed and the composition checked with theory as follows: percent carbon, theory 53.0, found 52.45; percent hydrogen, theory 8.2, found 8.20; percent oxygen, theory 34.0, found 35.15; percent nitrogen, theory 4.96, found 4.94. The structural formula of the diglucose ureide laurate is shown hereunder:

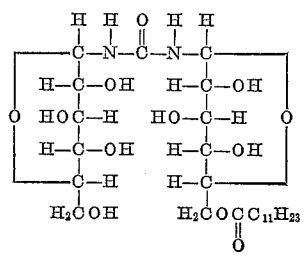

EXAMPLE II

*Diglucose ureide myristate*

The procedure of Example I was substantially repeated using 81 gm. (0.33 mole) of methyl myristate in lieu of the methyl laurate. A 60 g. yield of diglucose ureide myristate was thereby obtained. After purification by adsorption chromatography the residual product was found to have a melting point of 190–195° C. and a specific rotation of $$[\alpha]\frac{22°\ C.}{D} = +21.2°$$

in dimethyl sulfoxide. Upon analysis the following results were obtained: percent carbon, theory 54.3; found 53.70; percent hydrogen, theory 8.4, found 8.17; percent oxygen, theory 32.2, found 32.84; and percent nitrogen, theory 4.7, found 4.99.

EXAMPLE III

*Diglucose ureide palmitate*

The procedure of Example I was substantially repeated using 90 g. (0.33 mole) of methyl palmitate in lieu of the methyl laurate. A 81 gm. yield of diglucose ureide palmitate was thereby obtained. This crude material had a specific rotation of $$[\alpha]\frac{22°\ C.}{D} = +19.7°$$

It contained 4.21% nitrogen (theory 4.5%) and 39.76% palmitic acid equivalent (41.0%) after purification by adsorption chromatography. The novel product thus purified was found to have a melting point of 205–208° C. and a specific rotation of $$[\alpha]\frac{22°\ C.}{D} = +17.29°$$

in dimethyl sulfoxide. Upon analysis of the purified product the following results are obtained: percent carbon, theory 56.0, found 55.5; percent hydrogen, theory 8.7, found 8.43, percent oxygen, theory 30.9, found 31.68 and percent nitrogen, theory 4.5, found 4.37.

EXAMPLE IV

*Diglucose ureide stearate*

The procedure of Example I was substantially repeated using 100 g. (0.33 mole) of methyl stearate in lieu of methyl laurate. A 78 g. yield of diglucose ureide stearate was thereby obtained. This crude material had a specific rotation of $$[\alpha]\frac{25°\ C.}{D} = +18.8°$$

It contained 3.85% nitrogen (theory 4.33%) and 32.55% stearic acid equivalent (theory 43.6%). After purification by adsorption chromatography the novel product was found to have a melting point of 190–200° C. and a specific rotation of $$[\alpha]\frac{22°\ C.}{D} = +16.61°$$

in dimethyl sulfoxide. Upon analysis the following results were obtained: percent carbon, theory 57.2, found 58.16; percent hydrogen, theory 8.93, found 9.11; percent oxygen, theory 29.5, found 29.27, and percent nitrogen, theory 4.32, found 4.03.

EXAMPLE V

*Diglucose ureide oleate*

The procedure of Example I was substantially repeated using 100 g. methyl oleate in lieu of methyl laurate. A 75 g. yield of diglucose ureide oleate was thereby obtained. This crude product had a specific rotation of $$[\alpha]\frac{25°\ C.}{D} = +16.4°$$

After purification by adsorption chromatography the novel product was found to have a melting point of 160–170° C. and a specific rotation of $$[\alpha]\frac{22°\ C.}{D} = +17.8°$$

in dimethyl sulfoxide. Upon analysis the following results are obtained: percent carbon, theory 57.40, found 55.30; percent hydrogen, theory 8.64, found 8.42; percent oxygen, theory 29.63, found 25.83; and percent nitrogen, theory 4.32, found 4.69.

EXAMPLE VI

*Diglucose ureide cocoate*

The procedure of Example I was substantially repeated using 81 g. (0.33 mole) of methyl cocoate in lieu of the methyl laurate. A 42 g. yield of diglucose ureide cocoate was thereby obtained. The "cocoate" comprises methyl esters of coconut oil fatty acid containing about 5.4 caprylate, 8.4 caprate, 45.4 laurate, 18 myristate, 10.5 palmitate, 2.3 stearate, 7.5 oleate, 0.8 caproate, 0.4 arachidate, and 0.4% palmitoleate.

EXAMPLE VII

*Diglucose ureide tallowate*

The procedure of Example I was substantially repeated using 100 g. methyl tallowate in lieu of methyl laurate. A 62 g. yield of diglucose ureide tallowate was thereby obtained. The "tallowate" is a mixture of tallow fatty acid methyl esters containing about 6.3 myristate, 27.4 palmitate, 14.1 stearate, 49.6 oleate, and 2.5% octadecadienoate.

EXAMPLE VIII

*Structural determination of diglucose ureide monomyristate*

The pure diglucose ureide monomyristate obtained by the chromatographic procedure described in the specification, supra, was subjected to periodate oxidation in an effort to ascertain the position of the myristoyl group in the molecule. Periodate oxidation is specific for the oxidation of neighboring hydroxy groups. This technique has proved to be very valuable in the determination of the structures of many carbohydrates and their derivatives, and is well known to those skilled in the art.

An examination of the structure of unsubstituted diglucose ureide shows that 4 millimoles of periodate would be consumed and 2 millimoles of formic acid would be formed by periodate oxidation of one millimole of the ureide. This pattern of periodate oxidation would be affected only if a substituent group (such as a myristoyl group) was attached to either of the following positions: 2, 3, or 4. Substitution on the 3 position would result in the consumption of 2 millimoles of periodate per millimole and the production of one millimole of formic acid per millimole. Substitution on either the 2 or 4 position in the diglucose ureide would result in the consumption of 3 millimoles of periodate per millimole and the formation of one millimole of formic acid millimole. Substitution on the 6 position would not affect the normal course of periodate oxidation of the diglucose ureide.

Diglucose ureide myristate (0.4063 g., 0.6819 millimole) was dissolved in 30 ml. of water containing 4.16 millimoles of sodium periodate. The solution was made up to 50 ml. by the further addition of water; it was maintained at room temperature for 48 hours. The solution was then assayed for periodate and 1.54 millimoles were found. This represents a loss of 2.62 millimoles of periodate, which is a measure of that periodate consumed in the oxidation of the diglucose ureide myristate. This represents a consumption of 3.83 millimoles of periodate per millimole of diglucose ureide myristate. The free formic acid produced by this oxidation was measured by titrating the solution of reaction products. It was found that 1.765 millimoles of formic acid were produced per millimole of diglucose ureide ester added. These results are within the experimental errors customary for this technique and indicate an actual consumption of 4 millimoles of periodate per millimole of diglucose ureide myristate and the formation of 2 millimoles of formic acid.

The results of the oxidation of diglucose ureide myristate with sodium periodate lead to the conclusion that the fatty acid moiety (in this instance, the myristoyl group) is substituted on the 6-position of the glucose moiety, e.g.:

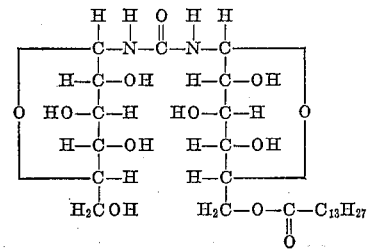

EXAMPLE IX

Detergency evaluation

The diglucose ureide glucoside mono-fatty esters are effective as cleaning agents per se. They also function quite suitably when built for both heavy and light duty detergency. It has previously been indicated that detergency depends upon a variety of factors; viz.: wetting power, emulsification, dispersion, and deflocculation. The following experiment was conducted to ascertain the effectiveness of the novel diglucose ureide esters in detergent systems.

A sample of "Foster D. Snell" ("FDS") soiled cotton was selected for the evaluation of the heavy duty detergents. This test sample was prepared by treating de-sized Indian Head cotton fabric in a soiling mixture containing 28.4% carbon, 35.8% coconut oil, 17.9% coconut oil fatty acids and 17.9% mineral oil suspended in carbon tetrachloride. The Indian Head cotton fabric was dipped into the suspension, air-dried and rinsed lightly in water to remove loosely adherent soil. It was again air-dried. A test sample of "Foster D. Snell" soiled wool, selected for evaluation of the light duty detergents, was prepared as follows: Sheets of Botany Mills virgin wool were scoured in a washing machine at 43° C. for 15 minutes using an aqueous solution of a commercial detergent. The wool was thereafter rinsed, using three changes of water with constant agitation for 15 minutes at 43° C. for each change. A standard soiling mixture was prepared by homogenizing 17 g. of a standard soil (comprising 7.3 parts of coconut oil fatty acids, 146 parts of coconut oil, 146 parts of deflocculated graphite and 1.1 parts of commercial detergent) in 50 ml. of water. The soil emulsion was dispersed in 3 liters of water; it was then added to a washing machine containing 23 sheets of the scoured rinsed wool and 10 gallons of water at 43° C. Ten minutes after the soil was added the machine was stopped and the water was allowed to drain off. The soiled wool was rinsed once for 5 minutes with 10 gallons of water at 43° C. and then hung up to dry in a dust-free room.

The composition of the built detergents is shown below in Table 1.

TABLE 1.—COMPOSITION OF BUILT DETERGENTS

|  | Type of Building | |
| --- | --- | --- |
|  | A, percent | B, percent |
| Active agent | 20.0 | 25.0 |
| Sodium tripolyphosphate | 40.0 |  |
| Tetrasodium pyrophosphate | 10.0 |  |
| Sodium metasilicate pentahydrate | 10.0 |  |
| Sodium sulfate | 19.5 | 75.0 |
| Sodium carboxymethylcellulose | 0.5 |  |

Detergents were compared by running simultaneous wash tests in a standard laboratory detergency testing machine, e.g., Launderometer. This machine rotates twenty jars end-over-end in a bath of fixed temperature. In each jar are placed standard soiled cloths, wash solution and rubber balls to provide "load." The test method gives useful comparative results provided, of course, that the detergents to be compared are run simultaneously and portions of the same batch of standard cloth are used. For check runs, the same series is repeated a second time and a third time. The values for each detergent can be averaged and incidental variables will largely cancel out when the averages are compared. Such a system is called a group experiment. The test conditions used with heavy duty detergents are shown below in Table 2.

TABLE 2.—TEST CONDITIONS

| | |
| --- | --- |
| Amount of solution per jar | 100 ml. |
| Mechanical washing assistants | 8 rubber balls ⅝" diameter. |
| Temperature | 60° C. |
| Speed of rotation of jars | 40 R.P.M. |
| Time for washing | 15 minutes. |
| Rinsing procedure | Rotate two minutes with 150 ml. of water of same hardness as wash water. |
| Fabrics per jar | Two swatches of "FDS" soiled cotton 3 x 2 inches. |
| Reflectance reading | By a standard reflectance meter, e.g., a Hunter Multipurpose Reflectometer set to read 100 on magnesia block. |

Detergents for light duty were tested using the above procedure substituting "FDS" soiled wool for the cotton and reducing the temperature to 43° C.

The esters of diglucose ureide were compared with a polyoxyethylene ester of tall oil, a nonionic detergent generally built for heavy duty household uses and sold commercially as "Sterox CD," and t-octylphenol polyether alcohol, a detergent sold commercially as Triton X-100. Detergency data were obtained in both hard water of a hardness equivalent to 15 U.S. grains and soft water of a hardness equivalent to 2 U.S. grains. A U.S. grain of hardness is equivalent to 17.1 parts per million of calcium carbonate. Results for both heavy duty and light duty detergency evaluation appear below in Tables 3 and 4.

TABLE 3.—HEAVY DUTY DETERGENCY EVALUATION
[Soiled cotton washed at 60° C.]

| Active Agent | Type of Building | Gain in Reflectance Units of Soiled Fabrics after Washing in Launderometer | | | |
| --- | --- | --- | --- | --- | --- |
| | | 2-Grain Water, Detergent Concentration | | 15-Grain Water, Detergent Concentration | |
| | | 0.25% | 0.35% | 0.25% | 0.35% |
| Diglucose ureide laurate | A | 14.7 | 18.2 | 11.9 | 14.6 |
| Diglucose ureide myristate | A | 15.0 | 17.3 | 12.9 | 15.6 |
| Diglucose ureide cocoate | A | 18.4 | 19.4 | 14.0 | 17.4 |
| Diglucose ureide palmitate | A | 15.0 | 17.6 | 14.9 | 17.4 |
| Diglucose ureide oleate | A | 15.6 | 17.6 | 15.3 | 15.8 |
| Diglucose ureide stearate | A | 13.1 | 15.5 | 13.6 | 15.4 |
| Diglucose ureide tallowate | A | 14.7 | 17.8 | 15.1 | 16.7 |
| Polyoxyethylene ester of tall oil | A | 2.5 | 4.4 | 3.8 | 4.2 |
| t-Octylphenol polyether alcohol | A | 8.0 | 8.9 | 9.5 | 9.3 |

TABLE 4.—LIGHT DUTY DETERGENCY EVALUATION
[Soiled wool washed at 43° C.]

| Active Agent | Type of Building | Gain in Reflectance Units of Soiled Fabrics after Washing in Launderometer | |
| --- | --- | --- | --- |
| | | 2-Grain Water, Detergent Concentration 0.3% | 15-Grain Water, Detergent Concentration, 0.3% |
| Diglucose ureide laurate | B | 6.1 | 6.6 |
| Diglucose ureide myristate | B | 9.4 | 8.9 |
| Diglucose ureide cocoate | B | 9.3 | 7.4 |
| Diglucose ureide palmitate | B | 8.4 | 9.9 |
| Diglucose ureide oleate | B | 10.6 | 9.3 |
| Diglucose ureide stearate | B | 8.3 | 8.6 |
| Diglucose ureide tallowate | B | 9.5 | 9.8 |
| Polyoxyethylene ester of tall oil | B | 3.2 | 2.9 |
| t-Octylphenol polyether alcohol | B | 8.5 | 9.5 |

It is readily seen from the above tables that the diglucose ureide fatty acid esters are comparable to or superior to standard commercial detergents when built for both light and heavy duty detergency. In fact, they are markedly superior as heavy duty detergents. For light duty the diglucose ureide oleate is exceptional among the compounds tested. The detergent effect obtained by combining our novel compounds with detergent builders is fully discussed in our copending application S.N. 663,579.

EXAMPLE X

*Detergency evaluation*

To test the effectiveness of the novel diglucose ureide mono-fatty esters as unbuilt detergents large soiled glass wickings were washed with these detergents in a Launderometer. The soiled wicks were prepared by dipping 1½" x 4" strips of resin-free glass wicking in a bath of 10% lard, dissolved in petroleum ether. The treating bath contained a trace of Oil Red O dye. The swatches were allowed to air dry and were stored overnight in a refrigerator until ready to be washed.

200 ml. of the test detergent solutions were preheated to 43° C. These solutions (about 0.1% concentration in each case) were placed in quart mason jars, each containing a soiled glass wick. Duplicate jars were prepared for each detergent in 2 grain water. The jars were sealed and rotated in a Launderometer (preheated to 43° C.) for 15 minutes at 40 revolutions per minute. One water (blank) sample was included containing 2 grain water and a soiled glass wick. At the end of the washing period the wicks were removed and hand-rinsed in 2 gallons of water at 43° C.

The washed wicks were dried at room temperature for 24 hours and then hexane extracted to recover the lard remaining in the wicks. Table 5 below reports the percent lard remaining in each wick based on the amount of lard originally present in the wick.

TABLE 5.—PERCENT LARD REMAINING IN WASHED GLASS WICKING

| Detergent | Average of Duplicate Wicks — Percent Lard in Wick After Scouring at 43° C. with 0.1% Detergent Solution (Determined by Hexane Extraction of Washed Wick) |
|---|---|
| Diglucose ureide laurate | 44 |
| Diglucose ureide palmitate | 46 |
| Diglucose ureide stearate | 43 |
| Polyoxyethylene ester of tall oil | 51 |
| Water (blank) | 90 |

The results of Table 5 clearly show that the diglucose ureide mono-fatty esters are superior to a standard commercial nonionic detergent for this purpose. The test conclusively shows that these novel compounds are useful as cleaning agents per se.

EXAMPLE XI

*Emulsification*

Since the compounds of the present invention are effective both as built and unbuilt detergents, it is apparent that they have some emulsification properties. The following test was conducted to determine the nature and extent of these properties. 10 ml. of heavy mineral oil ("Kaydol") containing an oil soluble dye and 100 ml. of 0.1% detergent solution were placed in a laboratory model hand homogenizer and homogenized twice. The solution was transferred to 100 ml. Nessler tube and respective volumes of the creamed layer and coalescent oil layer (if any) were measured after various intervals of time. After four days, emulsions containing cottonseed oil did not show any separation of oil when diglucose ureide laurate and myristate were employed as emulsifiers. With the other esters, only a very slight oil layer formed. The test was repeated substituting cottonseed oil for the heavy mineral oil. When mineral oil was emulsified, layering for four days did not result in separation of oil using the myristate, palmitate and stearate esters. With the diglucose ureide esters of other fatty acids, only a very slight separation of oil was observed.

The results indicate that the new compounds, especially diglucose ureide laurate and myristate, are excellent emulsifiers. It is obvious that these results are merely illustrative of the emulsification potential of the novel compounds of the present invention. Effective emulsification is predicated on several factors. An emulsion, to remain stable, must overcome (1) the gravitational effect of the difference in specific gravity between the oil phase and the water phase, (2) the force of coalescence between the droplets of the same liquid and (3) the adsorbing action for oil droplets by a third phase, such as a fabric immersed in the emulsion. Emulsification is an important property since it is closely related to the prevention of redeposition of soil on the clean fabric. During the washing process the soil must be thoroughly dispersed through the detergent solution and then held in this dispersion until it is carried away from the presence of the fabric. Effective emulsificants, such as the compounds of the present invention, tend to form a film around the surface of the soil particle. The individual coated particles form a stable emulsion containing the soil which can be successfully carried away from the surface of the clean fabric.

EXAMPLE XII

*Foaming*

Foam capacity and stability possessed by detergents are subject to a variety of practical and esthetic considerations. Surface activity, degree of dispersion and viscosity are factors which determine the nature of the foaming properties of a particular substance. Low and stable foams are desirable in that they may effect some flotation of solid material by preferential adsorption of the solid in the bubble film. This desirable result depends upon selective wetting whereby the surface film will wet and hold solid particles more strongly than the main body of the solution. The solid particles will rise with the bubble and be held in the foam. They will be thus carried away from the cleaned fabric. In automatic washing machines high foam is not particularly desirable since it increases the mechanical load or drag upon the machine. However, in manual dishwashing high foam is an important psychological factor. The typical housewife uses a foam as an empirical yardstick indicating that there is sufficient detergent in the wash water. Therefore, although most synthetic detergents continue to clean effectively even after they have stopped producing foam, the presence of stable foam serves to extend the detergent and reduce the ultimate cost to the consumer. The compounds of the present invention not only form by themselves a stable foam, but they have the capacity of increasing the foam stability of other foaming agents in the presence of soil. Compare Example XIII.

Foam capacity and stability in the absence of soil was measured at 43° C. by the Ross and Miles foam test. (Oil and Soap, 5, 99–102 [1941].) This test consists essentially of running 200 ml. of solution through a standard orifice into a water jacketed cylinder which contains 50 ml. of the same solution. The height of the column of foam separated is measured immediately and again after 1, 5 and 10 minute periods have elapsed. Evaluations were made using 2 and 15-grain water at 0.1 0.2, and 0.4% detergent concentration. Results are shown below in Tables 6 and 7.

TABLE 6

| Detergent | Ross and Miles Foam Test at 43° C., 2-Grain Water |||| 
| | Foam Heights in Cm., 0.1% detergent concentration ||||
| | 0 min. | 1 min. | 5 min. | 10 min. |
|---|---|---|---|---|
| Diglucose ureide laurate | 17.0 | 16.0 | 15.5 | 15.5 |
| Diglucose ureide myristate | 3.0 | 3.0 | 3.0 | 3.0 |
| Diglucose ureide cocoate | 8.0 | 8.0 | 7.0 | 7.0 |
| Diglucose ureide palmitate | 3.5 | 3.5 | 3.5 | 3.5 |
| Diglucose ureide oleate | 6.0 | 6.0 | 5.5 | 5.5 |
| Diglucose ureide stearate | 2.0 | 2.0 | 2.0 | 2.0 |
| Diglucose ureide tallowate | 2.5 | 2.0 | 2.0 | 2.0 |
| Polyoxyethylene ester of tall oil | 3.5 | 3.5 | 3.0 | 3.0 |
| t-Octylphenol polyether alcohol | 12.0 | 12.0 | 4.0 | 2.0 |

TABLE 7

| Detergent | Ross and Miles Foam Test at 43° C., 15-Grain Water ||||
| | Foam Heights in Cm., 0.1% detergent concentration ||||
| | 0 min. | 1 min. | 5 min. | 10 min. |
|---|---|---|---|---|
| Diglucose ureide laurate | 19.0 | 18.0 | 18.0 | 18.0 |
| Diglucose ureide myristate | 4.0 | 4.0 | 4.0 | 4.0 |
| Diglucose ureide cocoate | 6.0 | 6.0 | 5.5 | 5.0 |
| Diglucose ureide palmitate | 2.0 | 2.0 | 1.5 | 1.5 |
| Diglucose ureide oleate | 5.5 | 5.0 | 5.0 | 5.5 |
| Diglucose ureide stearate | 1.0 | 1.0 | 1.0 | 1.0 |
| Diglucose ureide tallowate | 2.5 | 2.5 | 2.5 | 2.5 |
| Polyoxyethylene ester of tall oil | 2.5 | 2.5 | 2.0 | 2.0 |
| t-Octylphenol polyether alcohol | 11.0 | 9.0 | 2.5 | 1.0 |

The results indicate that the diglucose ureide laurate is a high foamer, the cocoate is a moderate foamer and the other monoesters of diglucose ureide are low foamers. The t-octylphenol polyether alcohol is a typical example of a high-foaming nonionic detergent. It can be seen that the diglucose ureide monolaurate produces a greater foam volume than this material. The polyoxyethylene ester of tall oil is a typical low-foaming nonionic detergent.

EXAMPLE XIII

Suds stability

Suds stability in the presence of food soil was evaluated by a manual dishwashing test. The test procedure involved the washing of soiled dishes until the foam no longer completely covered the surface of the solution. The number of dishes and the time required to the foam end point were recorded. The method of preparation of the soiled dishes and the test procedure were as follows:

Porcelain dinner plates were smeared with one-half teaspoon per plate of a melted oil consisting of 80% hydrogenated cottonseed oil (Crisco), 20% flour and enough deflocculated graphite (Oildag) for a distinctive dirty coloring. The soiled plates were placed in racks and aged for 24 hours at room temperature. Four grams of detergent were placed on the bottom of a dishpan (12 cm. deep, 36 cm. bottom diameter, 38 cm. top diameter). One liter of 2-grain water at 45° C. was added thereto to dissolve the test detergent. An additional 3 liters of water at 45° C. were poured into the dishpan through a ½ gallon glass funnel from a height of 30 inches directly above the center of the dishpan. The funnel was partially filled with small ground glass stoppers to control the rate of water flow. After 30 seconds, the soiled dishes were individually washed with a dishrag until clean. Additional dishes were washed until the foam disappeared. The result of these tests appear in Table 8 below.

TABLE 8.—MANUAL DISHWASHING TEST
[0.1% active agent in 2-grain water at 43° C.]

| Detergent | Number of Dishes Washed at Foam End Point |
|---|---|
| Diglucose ureide cocoate | 8 |
| Diglucose ureide myristate | 15 |
| t-Octylphenol polyether alcohol | 14 |
| Polyoxyethylene ester of tall oil | 1 |

The above table represents the use of diglucose ureide monoesters not as foam stabilizers, but as detergents capable of producing stable foams. In this respect they compare favorably to standard commercial nonionic detergents. It is of interest that diglucose ureide myristate, though a low foamer, appears to produce a foam that is very stable in the presence of food soil.

In summary, our novel compounds are effective cleaning agents, either by themselves or in the presence of a builder. They are capable of forming stable emulsions which enhances their ability to carry away soil from the surface of a fabric without redeposition. They form both high and low foams which have remarkable stability. This desirable propensity makes them useful as foaming agents and detergents in toothpaste.

In addition to detergent applications, the diglucose ureide esters make suitable emulsifiers for pesticides, cosmetic creams and lotions, pharmaceutical salves and ointments and cutting oil. Their low toxicity suggests such applications as emulsifiers for drugs and fats administered by injection, food emulsifiers, air-entrapment agents for ice cream and other frozen desserts, foam stabilizers for milk products and dispersing agents for dehydrated food products. The novel esters may also be used as ashless sludge dispersants for lubricating oils and fuels.

We claim:
1. New chemical compounds having the general formula:

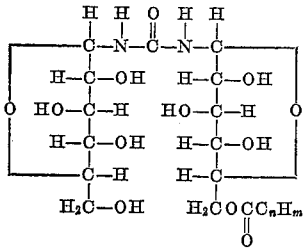

wherein $n$ is an integer having the value of at least 7 and not more than 23 and $m$ is an integer having a value between $2n-3$ and $2n+1$ inclusive.

2. Compounds according to claim 1 wherein $m$ has the value of $2n-1$.

3. Compounds according to claim 1 wherein $m$ has the value of $2n+1$.

4. As a new chemical compound, diglucose ureide monolaurate.

5. As a new chemical compound, diglucose ureide mono-myristate.

6. As a new chemical compound, diglucose ureide mono-palmitate.

7. As a new chemical compound, diglucose ureide mono-stearate.

8. As a new chemical compound, diglucose ureide mono-oleate.

9. A process for preparing fatty acid monoesters of diglucose ureide comprising contacting diglucose ureide with an ester having the formula:

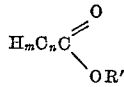

wherein $n$ is an integer having the value of at least 7 and not more than 23, $m$ is an integer having a value between $2n-3$ and $2n+1$ inclusive and R' is a lower alkyl radical in a mutual unreactive solvent in the presence of an alkaline catalyst.

10. A process according to claim 9 wherein $m$ is $2n+1$.

11. A process according to claim 10 in which the starting ester is an ester of lauric acid, whereby diglucose ureide mono-laurate is formed.

12. A process according to claim 10 in which the starting ester is an ester of myristic acid, whereby diglucose ureide mono-myristate is formed.

13. A process according to claim 10 in which the starting ester is an ester of palmitic acid, whereby diglucose ureide mono-palmitate is formed.

14. A process according to claim 10 in which the starting ester is an ester of stearic acid, whereby diglucose ureide monostearate is formed.

15. A process according to claim 9 in which the starting ester is an ester of oleic acid, whereby diglucose ureide mono-oleate is formed.

16. A process according to claim 9 in which the reaction mixture is heated under reduced pressure, whereby at least a portion of the by-product alcohol is distilled off.

17. A process according to claim 16 in which the reaction mixture is heated under a reduced pressure of 5-50 mm. Hg absolute at a temperature in the range of about 60-95° C., and a monoester of diglucose ureide is recovered from the residue.

18. A process according to claim 17 in which the mole ratio of diglucose ureide to ester is about 3:1.

19. A process according to claim 9 in which the solvent is selected from the group consisting of dimethylsulfoxide and monoethylformamide.

20. A process according to claim 9 in which the catalyst is selected from the group consisting of alkali metal carbonates, alkali metal hydroxides, alkali metal alcoholates, alkali metal phosphates and alkaline earth metal hydroxides.

References Cited in the file of this patent

UNITED STATES PATENTS

| | | |
|---|---|---|
| 2,612,497 | Meijer | Sept. 30, 1952 |
| 2,738,333 | Goldsmith | Mar. 13, 1956 |

FOREIGN PATENTS

| | | |
|---|---|---|
| 496,832 | Canada | Oct. 13, 1953 |

OTHER REFERENCES

Pigman: Carbohydrate Chemistry, 1948, Academic Press, N.Y.C., p. 381.

UNITED STATES PATENT OFFICE
CERTIFICATE OF CORRECTION

Patent No. 2,903,445                                                                        September 8, 1959

Lloyd I. Osipow et al

It is hereby certified that error appears in the printed specification of the above numbered patent requiring correction and that the said Letters Patent should read as corrected below.

Column 3, line 71, for "0.05–0.03" read -- 0.05–0.30 --; column 4, line 1, for "slower" read -- slowed --; line 6, for "no" read -- not --; column 6, line 10, for "15 mm. Hg absolute for one hour to remove any mois-" read -- 15 mm. Hg. absolute. After the first 6 hours of reaction --; column 13, Table 7, under the heading "10 min.", third item thereof, for "5.0" read -- 5.5 --; same column, fifth item thereof, for "5.5" read -- 5.0 --.

Signed and sealed this 22nd day of March 1960.

(SEAL)
Attest:

KARL H. AXLINE                                                    ROBERT C. WATSON
Attesting Officer                                               Commissioner of Patents